W. H. Fairbanks.
Raising Sunken Vessels.
N° 39,805.  Patented Sep. 8, 1863.
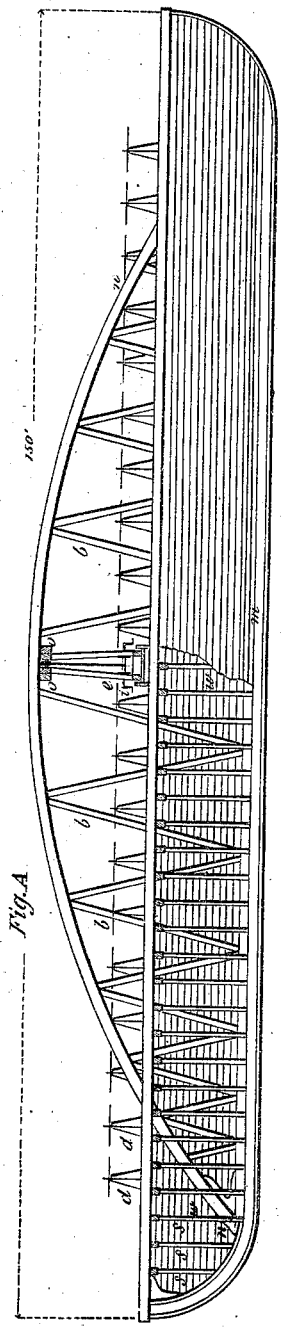
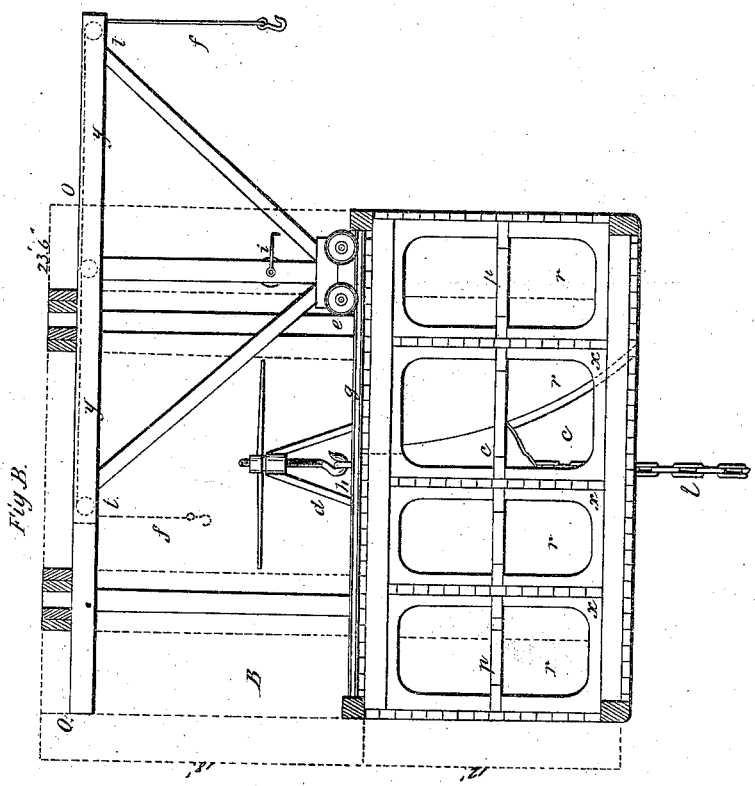
Witnesses.
John Titus
A. Moore
Inventor:
Wm H. Fairbank

UNITED STATES PATENT OFFICE.

WILLIAM H. FAIRBANK, OF BROAD CREEK NECK, MARYLAND.

IMPROVEMENT IN MODES OF RAISING SUNKEN VESSELS.

Specification forming part of Letters Patent No. 39,805, dated September 8, 1863.

*To all whom it may concern:*

Be it known that I, WILLIAM H. FAIRBANK, of Broad Creek Neck, in the county of Talbot, and in the State of Maryland, have devised a new method and invented a new combination of machinery and apparatus for its practical application (both which method and combination are also original and useful) for raising and recovering sunken vessels, together with all armor or other property in or upon them, as well as for raising and removing all other submerged bodies, and also for buoying and passing vessels and other bodies intended to be floated over bars, shoals, and other obstructions to their passage.

The method thus referred to I hereby declare to be embodied in the operation of one pair or any greater number of pairs of floats or buoys such as may be adequate to the purpose intended, of sufficient weight and strength to endure any shock or strain to which they may be exposed, and also of competent size and buoyancy or floating power to support the requisite machinery, apparatus, and workmen, and to raise and sustain the vessel or other body to be operated on, in combination with such a number of screws, pumps, and derricks, with their windlasses and pulleys, as may be requisite to produce the effect intended, or in combination with any machinery and apparatus which may be equivalent to these, connected and working with chains, cables, or any other attachments, passing in any manner through, over, under, or around the floats or buoys and the vessel or other body to be operated on.

To enable others skilled in the art to which my method and combination refers to understand as well as to make and use them, I hereby more fully describe them as follows, reference being had to the drawings, in which all similar parts are indicated by the same letters, and in which also—

Figure A is a side view, and Fig. B is an end view, of one of these floats or buoys, its construction, arrangement, machinery, and apparatus, every other float being similar to this in all material respects, and also their equivalents being similar.

The drawing is intended to represent a float or buoy one hundred and fifty (150) feet long, twenty-three and a half (23½) feet wide, and twelve (12) feet deep.

In order to secure the requisite strength, the side and bottom planks or timbers should be long enough to extend the whole length of the float, or they should be firmly spliced where joined.

Some five feet from each side of the float, and over it of sufficient height to be out of the way of all operations on its deck or flooring, extends an arch of strong timber nearly the whole length and down to the bottom of the float where it is mortised into the long timbers and strongly braced to one of the interior divisions or partitions hereinafter described. One of these arches is shown and marked *u* in Fig. A, and the braces are marked *b*. There are two of these arches similarly constructed, situated, and secured on each float. In floats of a different width from this the arches will, of course, be nearer to or farther from the outside, as may be convenient and suitable to their strength and firmness. These arches are also tied together by a sufficient number of cross-beams, (marked *o*.) On Fig. B two of these beams are shown as placed near together, between which the arms of the derrick are made to move by a ratchet, fixed pulley, and rope, or any simple equivalent. They are also shown at the top of the arches by the same letter on Fig. A.

On Fig. B are shown four longitudinal sections, *v*, of the interior of the float made by three vertical divisions or partitions, *x*, extending its whole length and depth. The middle one of these is made entirely water-tight. Across the middle, and extending the whole width and depth of the float, is made one other water-tight division or partition, which thus divides its interior into four water-tight compartments. Besides this middle cross-partition, there are intended to be forty-eight others in the float, as represented, extending its whole width and depth. One-half or twenty-four of these are represented on Fig. A and marked *w*. The number of these cross-partitions, however, need not be greater than what will suffice to give the float sufficient strength and firmness, together with proper rests or foundations for the machinery and operations on deck.

On Fig. B is shown one of the holes or apertures (marked *c*) for the passage of the chain or cable from the top to the bottom of the float. These apertures are made from top to bottom of the float along the line of a plane, which would divide it longitudinally into two equal parts, the middle partition x being placed a little on one side to admit them. Each of these apertures is of sufficient size at the deck or flooring above to admit the free passage of the chain or cable, and it widens downward, as shown in the drawings, toward the side of the float to be presented to the body to be raised or supported, so as to relieve the strain of the chain or cable, allow it to play freely, and thus prevent the rolling of the float. The three other sides of these apertures may be vertical. In order to give to these apertures sufficient firmness they may be built round with strong framing, or even solid timber, and guarded on the inside with planks, or even with cast or wrought iron, especially at the top and bottom, and fastened there by flanges or other proper arrangements. Part of one side of c in Fig. B is omitted, so as to show some links of the chain in its passage through it. One of these apertures or holes is necessary to each screw, or its equivalent. Two of these, therefore—one on each float—are necessary to a chain or cable. Twenty screws, therefore, as shown in Fig. A of the drawings, would require as many of these holes or apertures.

On Fig. B is shown a cross-tie, p, of which as many may be used as the strength and firmness of the float or buoy may require.

The frame-work requires particular care in its construction, especially at the four principal angles, where the sides and ends of the float are joined together, the bottom being constructed in any of the usual ways, of timber and workmanship of proper strength. The other timbers, whether plank or scantling, may be fastened at the principal angles by locked joints formed of a wedge-shaped notch, resting firmly and fitting closely on a corresponding bearing. Where the timber is all of the same width, these notches and bearings, if cut in to the depth of one-fourth of it, each will bring the edges firmly together, and thus form a solid wooden wall. These joints, when made in the form of a dovetail or with the parts widening outwardly, constitute the strongest possible joint and resist both an inward and an outward pressure without either pins, bolts, or spikes, comparatively few of which will be needed. A similar arrangement of joint will be found the best where the interior partitions are joined to the sides and ends of the floats. The timbers of the interior partitions where they cross each other may be made to grip and hold each other firmly by perpendicular notches equal to the thickness of the timber to be inserted into them. The timbers join and cross each other at right angles. Planks two or three inches thick, with but few heavier timbers, will be sufficient for a float of almost any size. Thus arranged, they may be made to yield the greatest strength and firmness with the least possible expenditure of material and labor.

The deck-planks run crosswise, and may be dovetailed into the upper side timber. In all cases where short timbers are used care should be taken to break joints. An oblique form may be given to the end of the float by the use of side or guide posts and cross-timbers.

Over the frame-work, formed as above described, are fastened planks or thick boards to make the float completely water-tight. Ordinary valves or slides may be fitted to the water-tight compartments, so as to admit or exclude the water, rendering it practicable to fill or to unfill, and thus to sink or raise the floats at pleasure with the use of pumps. Over each hole or aperture is placed a screw, where that is the machinery employed, with its feet resting on the deck or upper flooring over two of the cross-partitions. The number and size of the screws to be employed will, of course, depend on the weight to be raised or supported. The screw is represented by d on Figs. A and B of the drawings. The whole number indicated there is twenty, which, with an equal number on the corresponding float, would make forty, as represented in the drawings.

On Fig. B is a hook at the lower end, to which a chain or cable is attached.

On Figs. A and B is a derrick, e, with its windlass i, its arms Y, its tackle t, and its tackle-ropes f. The windlass and the tackle may be of any ordinary form and power according to the weights to be moved by it. The arms of the derrick are moved between the beams o of the arch and along the railroad g by a fixed pulley or ratchet of the simplest form. The distance through which the derrick moves over the railroad must always, of course, depend upon that to which the arm is to be extended over the vessel or other body, from which its loading is to be received on the hooked rope at the end of its arm.

In practical operation with the machinery and apparatus herein described, a chain or chains must be employed to sink to the bottom of the vessel or body to be operated on where the chain or chains pass under it. They may be made to pass under such body by dragging backward and forward from side to side until the desired result is attained. The weight of the chain or chains must depend upon the amount of material they are required to bear and the depth to which they are required to be sunk. Any chain managed as above described would cut its way under any body to be operated on with but little difficulty. If a different form of application from that above described is in any case adopted, a corresponding change must be made in the mode of approach.

In practical operation with the floats and machinery, the former are moved parallel and nearer to each other over the body to be raised or supported. While the body is below them they may be kept separate by beams of proper arrangement passed from one to the other and properly fastened. As the body operated on rises to its place between the floats, these beams may be knocked away. The sides of the floats toward which the apertures or cable holes are bent should always be presented toward the object to be operated on. The cables round the ends of the vessel or other body to be raised or supported may be kept from slipping off by tie or brad chains extending firmly along each side of the vessel or other body and fastened to the cables near to and under the ends of the body.

I do not claim as my invention any of the separate parts composing this my device for raising sunken vessels and other submerged bodies and for lifting vessels over bars, as described and represented in the accompanying drawings and specification; but What I do claim as my invention, and desire to secure by Letters Patent, is—

The combination of the screws, jacks, and chains, or their equivalents, when used in connection with a pair of floats or buoys of similar size, form, and construction, the chains passing down through tubes centrally situated along the length of each buoy or float when each of the tubes is so formed with one curved or oblique side as to prevent the chains from binding in the tubes when the sunken object to which the chains are applied approaches toward the surface, thus continuing the strain or pressure centrally on the decks of the buoys or floats and nearly in a vertical direction from the commencement of the lifting until the object is raised to the surface of the water, substantially as represented and described in the accompanying drawings and specification.

Subscribed by the petitioner February 24, 1863.

WM. H. FAIRBANK.

Witnesses:
  B. SEVERSON,
  JOHN TITUS.